United States Patent
Park et al.

(10) Patent No.: US 8,448,151 B2
(45) Date of Patent: May 21, 2013

(54) METHOD FOR BINARIZING INITIAL SCRIPT ON OPERATING SYSTEM AND OPERATING METHOD OF BINARY SCRIPT

(75) Inventors: Seungmin Park, Daejeon (KR); Chaedeok Lim, Daejeon (KR); Hojoon Park, Daejeon (KR); Dongwook Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 760 days.

(21) Appl. No.: 12/630,178

(22) Filed: Dec. 3, 2009

(65) Prior Publication Data

US 2010/0146254 A1   Jun. 10, 2010

(30) Foreign Application Priority Data

Dec. 8, 2008 (KR) .................. 10-2008-0124125
Nov. 2, 2009 (KR) .................. 10-2009-0105072

(51) Int. Cl.
*G06F 9/45* (2006.01)
*G06F 9/00* (2006.01)
*G06F 9/24* (2006.01)
*G06F 15/177* (2006.01)

(52) U.S. Cl.
USPC ............ 717/140; 717/148; 713/1; 713/2

(58) Field of Classification Search
USPC .......................................... 717/140
See application file for complete search history.

(56) References Cited

U.S. PATENT DOCUMENTS

| | | | | |
|---|---|---|---|---|
| 5,339,435 | A | * | 8/1994 | Lubkin et al. ............. 713/2 |
| 5,799,187 | A | * | 8/1998 | McBrearty ................ 713/2 |
| 7,100,039 | B2 | * | 8/2006 | Fisher ...................... 713/2 |
| 7,330,967 | B1 | * | 2/2008 | Pujare et al. ............. 713/2 |
| 2005/0097309 | A1 | | 5/2005 | Chang |
| 2005/0193371 | A1 | * | 9/2005 | Fausak ................... 717/116 |

FOREIGN PATENT DOCUMENTS

| | | |
|---|---|---|
| JP | 2004-164545 | 6/2004 |
| KR | 1999-0011346 | 2/1999 |
| KR | 1020020090266 | 12/2002 |

OTHER PUBLICATIONS

Mohay et al., "Kernel and Shell Based Applications Integrity Assurance," IEEE, 1997, 10pg.*
Guido van Rossum, "An Introduction to Python for UNIX/C Programmers," 1993, 8pg.*
"Shell Script", Wikipedia, retrieved Feb. 21, 2011.
Greg Goebel, "An Introduction to Shell Programming", Public Domain, May 1, 2003.

* cited by examiner

*Primary Examiner* — Li B Zhen
*Assistant Examiner* — Ryan Coyer
(74) *Attorney, Agent, or Firm* — Staas & Halsey LLP

(57) ABSTRACT

A method for binarizing initial script on an operating system includes: calling shell script to be binarized in a secondary memory unit; generating an execution table by translating the called shell script; generating a source program by merging a previously prepared source code template with the execution table; and combining a command sub-routine with the source program and binarizing the shell script by performing compile and building operations. According to the above, it is possible to minimize a booting delay time without using a fork & exec technique by applying the binary script instead of the shell script during performing system initialization while booting.

10 Claims, 4 Drawing Sheets

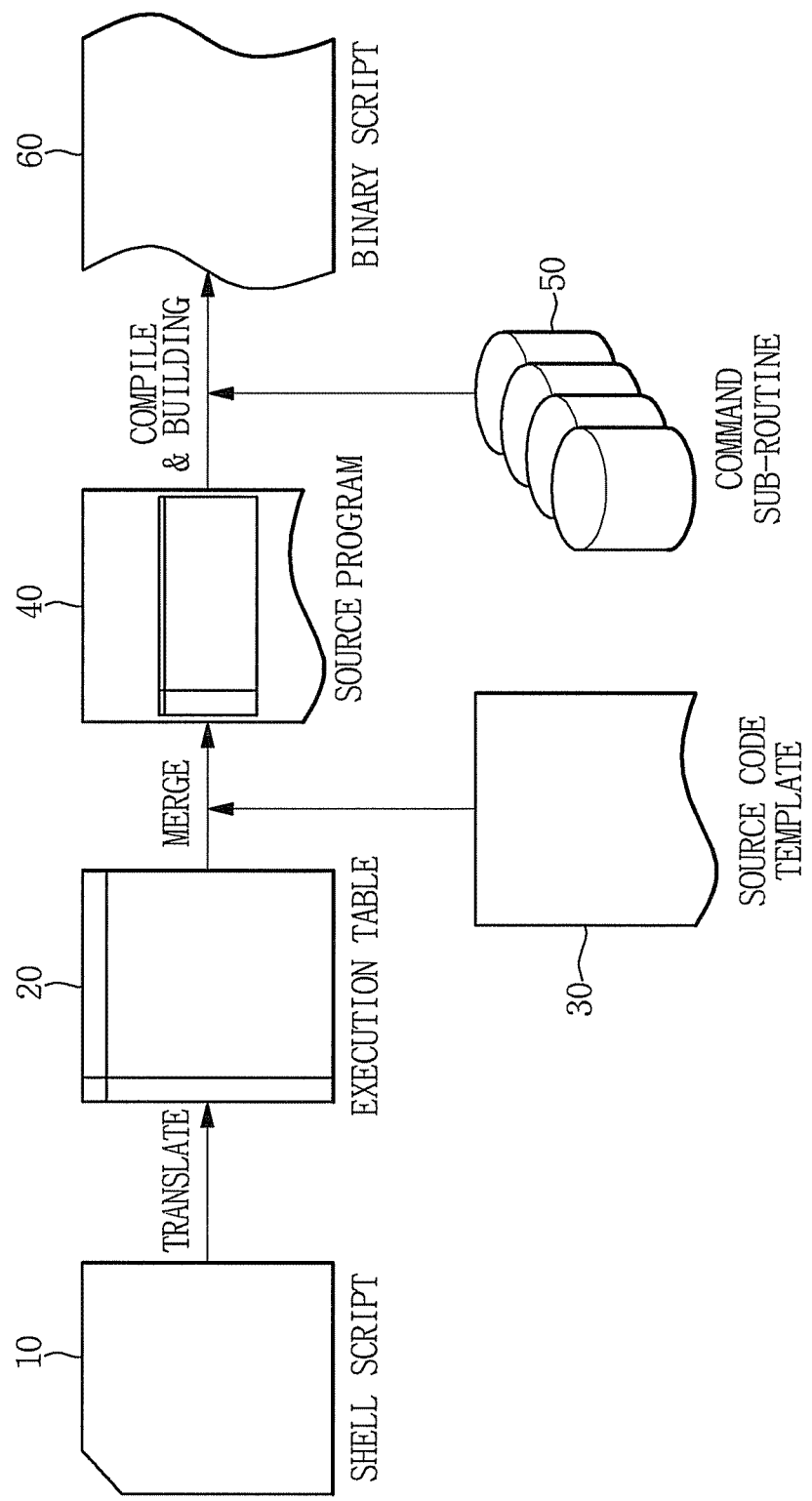

FIG. 2

| ITEM | DESCRIPTION |
|---|---|
| fp | - POSITIONS OF COMMANDS IN MAIN MEMORY UNIT<br>; THIS COMMAND REPRESENTS POSITIONS ON MAIN MEMORY UNIT STORING CODES EXECUTING COMMANDS. IN MOST OPERATING SYSTEMS, THIS VALUE IS EXPRESSED AS ADDRESS VALUE (POINTER). |
| cmd | - DETAILED COMMAND NAME<br>; THIS COMMAND REPRESENTS DETAILED INDICATIONS WHEN CORRESPONDING COMMAND IS EXECUTED. THE DETAILED COMMAND IS EXPRESSED AS AN INTEGRAL VALUE AND IS PREVIOUSLY DEFINED BEFORE THE BINARY SCRIPT IS PREPARED. |
| detachable | - WHETHER OR NOT THE COMMAND IS EXECUTED<br>; IN THE CASE OF A COMMAND TO TAKE A LONG DELAY TIME, IT IS DETERMINED WHETHER OR NOT THE COMMAND IS EXECUTED AS THE INTEGRAL FORM IN PARALLEL FOR PARALLEL EXECUTION. IN MOST CASES, IT IS NOT NECESSARY TO EXECUTE THE COMMAND IN PARALLEL. |
| args | - FACTORS<br>; THIS COMMAND REPRESENT FACTORS TRANSMITTED TO THE CORRESPONDING COMMAND. 'CMD' IS ALSO A KIND OF THE FACTOR, BUT WHEN ACTUALLY USED, THE REST FACTORS OTHER THAN 'CMD' WHICH ARE USED AT HIGHER FREQUENCY ARE INCLUDED HEREIN. A PLURALITY OF FACTORS CAN BE POSITIONED. |

FIG. 3

| ITEM | DESCRIPTION |
|---|---|
| bs_config_net | - NETWORK SET-UP<br>; THIS COMMAND SETS UP NETWORK WHICH OPERATING SYSTEM WILL USE. EX) DEVICE ACTIVATION, ADDRESS SETTING, PATH DESIGNATION, COMPUTER NAME (HOST NAME) SETTING. |
| bs_echo | - CONSOLE OUTPUT<br>; THIS COMMAND DISPLAYS CHARACTER STRINGS ON A SCREEN OR OUTPUT DEVICE. THIS COMMAND IS COMMONLY USED FOR DEBUGGING. |
| bs_launch_process | - EXECUTING EXTERNAL COMMAND<br>; THIS COMMAND IS USED WHEN THE EXTERNAL COMMAND WHICH THE BINARY SCRIPT CANNOT PROCESS IS EXECUTED, BUT THIS COMMAND IS USED AS A METHOD FOR STARTING A FINAL APPLICATION PROGRAM AT THE BOOTING STEP. |
| bs_load_mod | - INITIALIZING KERNEL MODULE<br>; THIS COMMAND IS A COMMAND FOR INITIALIZING THE KERNEL MODULE WHICH IS A PART OF THE OPERATING SYSTEM. |
| bs_mount_fs | - INITIALIZING A SECONDARY MEMORY UNIT<br>; THIS COMMAND IS USED TO INITIALIZE THE SECONDARY MEMORY UNIT BEFORE USING THE SECONDARY MEMORY UNIT. |
| bs_readahead | - PREREADING<br>; THIS COMMAND IS USED TO FIRST READ A LIBRARY PART OF A USER APPLICATION PROGRAM FROM THE SECONDARY MEMORY UNIT. |
| bs_setup_env | - SETTING ENVIRONMENT VARIABLES<br>; THIS COMMAND DEFINES SEVERAL ENVIRONMENT VARIABLES REQUIRING THE USER LICATION PROGRAM. |
| bs_wait | - WAIT COMMAND<br>; THIS COMMAND USED WHEN BEING CHANGED INTO A WAIT STATE SO THAT OTHER PROCESSORS OR APPLICATION PROGRAMS CAN REACH A PROPER STEP. EX) LIMITLESS WAIT, PREDETERMINED TIME WAIT, ETC. |

METHOD FOR BINARIZING INITIAL SCRIPT ON OPERATING SYSTEM AND OPERATING METHOD OF BINARY SCRIPT

RELATED APPLICATIONS

The present application claims priority to Korean Patent Application Serial Number 10-2008-0124125, filed on Dec. 8, 2008 and Korean Patent Application Serial Number 10-2009-0105072, filed on Nov. 2, 2009, the entirety of which are hereby incorporated by reference.

BACKGROUND OF THE INVENTION

1. Field of the Invention

The present invention relates to a method for binarizing initial script on an operating system and an operating method of binary script and, more particularly, to a method for binarizing initial script on an operating system capable of implementing quick booting by efficiently binarizing the initial script used for booting an embedded operating system, binary script, and an operating method of the same.

2. Description of the Related Art

Booting is a process to initialize a system and prepare an application program which a user will need in order to use an operating system.

During the booting process, a system initialization step which is a third step is constituted by script which an aggregation of a series of commands.

The script is written on a file as a series of procedures by automating a process in which the user proceeds to input a command on a shell. At this time, the script is referred to as shell script.

The shell script is provided in a secondary memory unit and a kernel which a core function of the operating system calls and initializes the corresponding shell script as the last process of the initialization process. Since the shell script is an aggregation of commands that are being performed on the shell, the shell is required to perform the command in the shell script.

Commands including the shell are constituted by processes due to characteristics of a UNIX-based operating system, a start scheme of the process follows a fork & exec technique. Herein, the fork & exec is one of kernel-supported application program interfaces (API).

First, the fork technique is a technique to create a new process by copying the process itself. At this time, a relationship between the new created process and the original process can be expressed as a relationship between Parents and children. That is, the newly created process serves as a child process of the original process.

Meanwhile, the exec technique is a technique executed by receiving a new command from the secondary memory unit to the exec to substitute the command itself for the new command. When two techniques are mixed up, the operating system can execute the new command.

By this method, the corresponding procedure is repeated until the shell script is terminated. In general, a command to operate a user application program is described in the last shell script so as to perform a fourth step of the booting.

When the shell script is used at a third step of the booting, the user who can use the shell script can easily modify the initialization process. However, when the shell script is used, booting speed is delayed.

In other words, since the shell script is an aggregation of character strings, a complicated text analysis is required to analyze each of the character strings as the command. Since a repetitive operation is generally performed in the text analyzing process, a processing time is extended and it is difficult to predict its termination.

Further, the fork & exec technique is used in order to perform the command in the shell script. That is, a new process needs to be created in order to execute the command of the shell script and the newly created process is converted into the command through a transition (exec) process. Therefore, several complicated processes are performed without directly executing the command, such that the booting time is delayed.

Meanwhile, common users use a graphical user interface (GUI) based on graphics and an application program which the users desire to use are also converted into programs requiring enhanced complexity. As a result, the initial shell script is gradually lengthened as the application program becomes complicated. Therefore, a long booting delay time is required in order to perform the shell script during booting the operating system.

As described above, since the fork & exec technique is required to be used in order to perform the further lengthened initial shell script, the booting delay cannot be solved by the present method.

SUMMARY OF THE INVENTION

In order to solve the above-mentioned problem, an object of the present invention is to provide a method for binarizing initial script on an operating system capable of minimizing a booting delay time without using a fork & exec technique by applying binary script instead of shell script during performing initialization of a system in booting, binary script, and a method of operating the same.

In order to achieve the above-mentioned object, a method for binarizing initial script on an operating system according to an aspect of the present invention includes: calling shell script to be binarized in a secondary memory unit; generating an execution table by translating the called shell script; generating a source program by merging a previously prepared source code template with the execution table; and binarizing the shell script by combining a command sub-routine with the source program and performing compile and building operations.

The execution table defines at least one of positions of commands in a main memory unit, a detailed command name, whether or not each command is executed in parallel, and a factor transmitted to the corresponding command.

The method includes putting one or more external commands into a sub-routine before binarizing the shell script.

The one or more external command is at least one of a network set-up command, a console output command, an execution command of the external command, a kernel module initialization command, a secondary memory unit initialization command, a preread command, an environment variable set-up command, and a wait command.

In case of the binary script, at least one command defined in the shell script is directly inserted into a sub-routine in the corresponding binary script.

The binary script is stored in the secondary memory unit and is used instead of the shell script during initializing a system while booting.

Meanwhile, in order to achieve the above-mentioned object, a method of operating binary script according to another aspect of the present invention includes: calling an execution table where the binary script is written; sequentially calling and reading the binary script from the called execution table; classifying a command and a factor included in a sub-routine of the corresponding binary script by searching the sub-routine of the called binary script; and executing the classified command and factor, wherein after the command and factor included in the sub-routine of the called binary script are executed, the next binary script written in the execution table is called.

The command included in the sub-routine of the binary script is at least one of a network set-up command, a console output command, an execution command of the external command, a kernel module initialization command, a secondary memory unit initialization command, a preread command, an environment variable set-up command, and a wait command.

The next binary script is continuously called until all the binary scripts written in the execution table are called.

The method further includes terminating system initialization and performing the next booting process when binary to be read is no longer in the execution table.

According to an embodiment of the present invention, by directly inserting limited commands during initializing script into a sub-routine in binary script, it is possible to improve a processing speed without processing the commands by using a fork & exec technique.

Further, according to the embodiment of the present invention, since all contents (execution table, sub-routine) which the script will process are transferred to the binary script at the time of loading the binary script from a secondary memory unit to a main memory unit, the script is in progress while excluding an access speed to the secondary memory unit without accessing the secondary memory unit even at the last step when the script is in progress, thereby reducing the processing speed.

In addition, according to the embodiment of the present invention, since an order is provided only on a serialized execution table, the booting process is managed on the table, not the script itself, such that there is nothing to worry about that the order is mixed or tracing is missing in the middle even though the binary script is less flexible than the shell script in terms of flexibility.

Moreover, according to the embodiment of the present invention, since the shell itself is not used, the shell can completely be deleted in the operating system, such that a method to control the system is interrupted even though an unauthorized accessor has a manger authority, thereby greatly increasing the security of the system.

Further, since even users other than an operating system developer can easily create a booting order or script through some training processes, operation efficiency is improved.

BRIEF DESCRIPTION OF THE DRAWINGS

FIG. 1 is a diagram referenced for describing a method for binarizing initial script according to an embodiment of the present invention;

FIG. 2 is a diagram reference for describing an execution table according to an embodiment of the present invention;

FIG. 3 is a diagram reference for describing a command sub-routine according to an embodiment of the present invention.

DETAILED DESCRIPTION OF THE PREFERRED EMBODIMENTS

Figure 4:
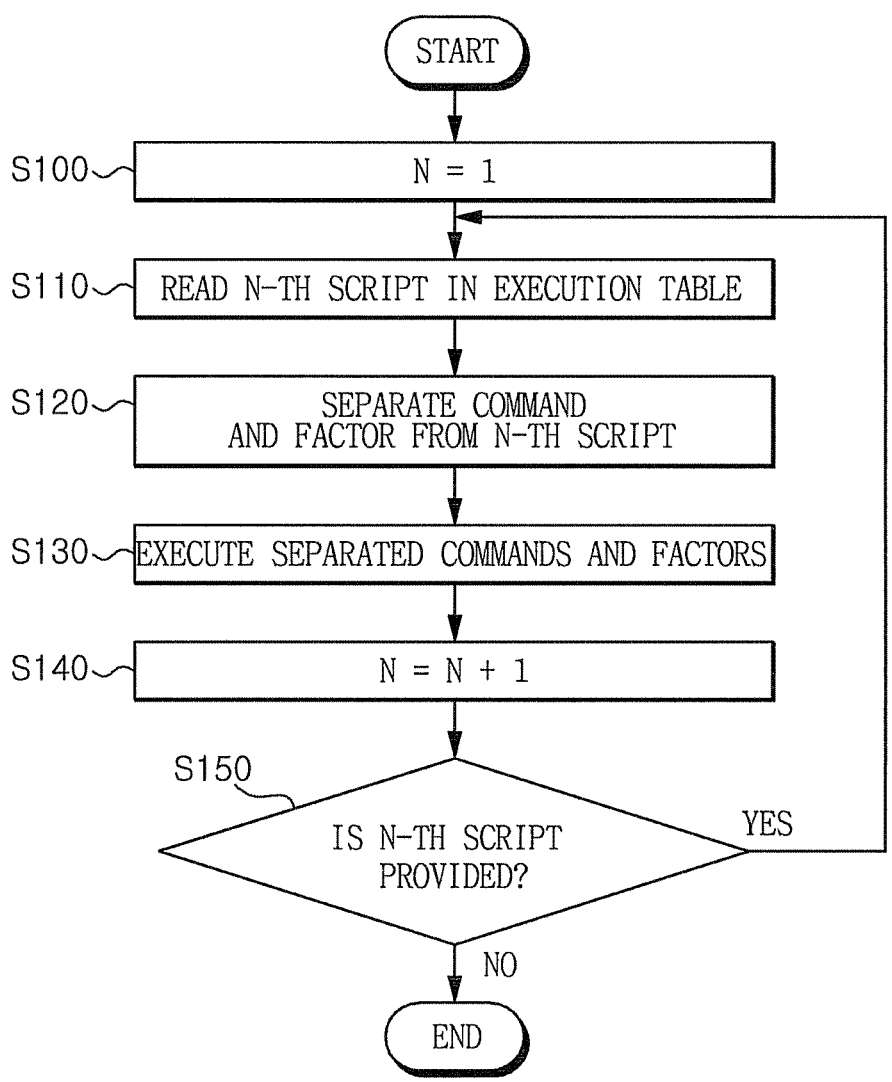
FIG. 4 is a flowchart showing an operational flow of a method of operating binary script according to an embodiment of the present invention.

Hereinafter, embodiments of the present invention will be described with reference to the accompanying drawings.

FIG. 1 is a diagram referenced for describing a method for binarizing initial script on an operating system according to an embodiment of the present invention.

As shown in FIG. 1, a binary script generator first calls a shell script 10 to be binarized in a secondary memory unit.

Herein, the shell script 10 is written on a file as a series of procedures by automating a process in which a user proceeds to input a command on a shell. At this time, the shell script 10 is prepared as a text file of a human readable format.

The shell script 10 is called by a kernel of the operating system while initializing the system during booting and the kernel initializes the system on the basis of the called shell script 10.

At this time, the binary script generator generates an execution table 20 by translating the called shell script 10. The execution table 20 as a kind of a source program defines 'fp', 'cmd', detachable', 'args', etc. shown in FIG. 3. The execution table 20 will be described in detail with reference to FIG. 3.

The binary script generator generates one source program 40 by merging the execution table 20 with a previously prepared source code template 30 when the execution table 20 is prepared.

Before binarizing the shell script 10, the binary script generator prepares a command sub-routine 50 storing commands such as 'be_config_net', 'be_echo', 'bs_launch_process', 'bs_loadmod', 'bs_mount_fs', 'bs_readahead', 'bs_setup_env', 'bs_wait', etc. shown in FIG. 4. The commands stored in the command sub-routine 50 will be described in detail with reference to FIG. 4.

Thereafter, the binary script generator compiles the source program 40 by combining the source program 40 with the command sub-routine 50 and binarizes the initial script by performing a building operation after the compile operation.

All the commands are processed by a fork & exec technique during the system initialization process using the shell script 10 while booting. At this time, the commands used during the system initialization process are extremely limited. Therefore, according to the embodiment of the present invention, since the commands are not processed by using the fork & exec technique by directly inserting the limited commands into the sub-routine in the binary script 60, it is possible to improve a processing speed.

The completed binary script 60 is stored in a secondary memory unit and is used instead of the shell script 10 during the system initialization process while booting.

FIG. 2 is an exemplary diagram showing a shape of an execution table adopted in binarizing a shell script 10.

As shown in FIG. 2, 'fp' represents the position of each command in a main memory unit. More specifically, 'fp' represents positions where codes executing the commands are contained in the main memory unit. Herein, a value of 'fp' means an address value.

Meanwhile, 'cmd' represents a detailed command name. More specifically, the 'cmd' represents detailed indications when the corresponding command is executed and the detailed command is expressed as an integer value and is defined before generating the binary script 60.

'detachable' represents whether or not the command is executed in parallel. That is, 'detachable' determines whether or not a command that takes a long delay time is executed in parallel as an integer form in order to execute other commands in parallel. However, in most cases, the commands do not need to be executed in parallel.

'args' represents factors to be transmitted to the corresponding command. Of course, 'cmd' is a kind of the factor, but when actually applied, factors of higher frequency are included in 'cmd' and the rest factors are included in 'arg'.

At this time, a plurality of factors are included in 'arg'.

Of course, in FIG. 2, an example in which 'fp', 'cmd', 'detachable', and 'arg' are stored in the execution table 20, but this is just the embodiment and the present invention is not limited thereto.

Meanwhile, FIG. 3 is an exemplary diagram showing a shape of a command sub-routine 50 adopted in binarizing shell script according to the present invention.

As shown FIG. 3, 'beconfig_net' is a network set-up command. In other words, 'be_config_net' is a command for setting up a network to be used on the operating system. For example, 'be_config_net' is used to activate a device, set an address, designate a path, and set a computer name (host name), etc.

'be_echo' is a command for console output. That is to say, 'be_echo' is a command for displaying a character string on a screen or an output device and is commonly used for debugging.

'be_launch_process' is a command for executing an external command. In other words, 'be_launch_process' is used when executing the external command which cannot be processed by the binary script 60. Further, 'be_launch_process' may be used to start a final application program while booting.

'be_load_mod' is a command for initializing a kernel module. In other words, 'be_load_mod' is a command for initializing a kernel module which is a part of the operating system.

'be_mount_fs' is a command for initializing the secondary memory unit. In other words, 'be_mount_fs' is a command for initializing the secondary memory unit before using the secondary memory unit.

'bs_readahead' as a preread command is a command to previously read a library part of the user application program from the secondary memory unit.

'be_setup_env' is a command for setting up environment variables. In other words, 'be_setup_env' defines several environment variables requiring the user application program.

'be_wait' as a wait command adopted when other process application programs itself are changed into the wait state so as to reach a proper step. For example, 'be_wait' is adopted for limitless wait, predetermined time wait, etc.

Of course, the present invention is not limited to the command sub-routines shown in FIG. 3 as the embodiment and the rest command sub-routines can also be applied.

FIG. 4 is a flowchart showing an operational flow to perform a system initialization process while booting by using binary script according to the present invention.

The booting process as a process of initializing the system for the user to use the operating system and preparing the application program which the user uses includes a boot loading step of copying the kernel which is a core function of the operating system to the main memory unit form the secondary memory unit after applying power, a step of initializing the kernel which the core function of the operating system, a step of sequential operations for initializing the system after the kernel of the operating system is stationed in the main memory unit, and a step of allowing the user to use a common application program which the user desires by calling the application program from a file system to the main memory unit.

The binary script 60 according to the present invention is applied to a step in which the kernel of the operating system sequentially performs the operation to initialize the system in the main memory unit.

Therefore, referring to FIG. 4, the system initialization process will be, described in more detail. First, the execution table 20 is called in order to perform the system initialization process and N-th script is read in the execution table 20. In an initial step of the system initialization process, a value of N=1 is acquired.

Therefore, the operating system reads the first binary script 60 of the execution table 20 and separates the factors from the command. At this time, the commands read from the first binary script 60 of the execution table correspond to commands included in the sub-routine of the first binary script 60, that is, a command sub-routine of FIG. 4.

After the first binary script 60 is executed and the value of N is increased by 1, it is verified whether or not the N-th binary script 60 is provided in the execution table 20. That is, it is verified whether or not the second binary script 60 is provided in the execution table 20.

At this time, when the second binary script 60 is provided in the execution table 20, steps 'S100' to 'S130' are repeated.

The process is repetitively performed until the corresponding binary script 60 is not provided in the execution table 20 by continuously increasing N by 1.

If the corresponding script 60 is no longer provided in the execution table 20, the operating system performs the subsequent process when the system initialization is terminated.

As described above, a method for binarizing initial script on an operating system and a method of operating binary script according to the present invention is not limited to the configuration and method of the embodiments described as above, but the embodiments may be configured by selectively combining all the embodiments or some of the embodiments so that various modifications can be made.

What is claimed is:

1. A method for binarizing an initial shell script, comprising:

calling the initial shell script to be binarized in a secondary memory unit;

generating an execution table by translating the called initial shell script;

generating a source program by merging a previously prepared source code template with the execution table;

binarizing the initial shell script by combining a command sub-routine with the source program and performing compile and building operations, wherein the binarizing does not comprise interpreting; and using the resulting binary script instead of the initial shell script during initializing a system while booting an operating system.

2. The method of claim 1, wherein the execution table defines at least one of positions of commands in a main memory unit, a detailed command name, whether or not each command is executed in parallel, and a factor transmitted to the corresponding command.

3. The method of claim 1, further comprising: putting one or more external commands into a sub-routine before binarizing the initial shell script.

4. The method of claim 3, wherein the one or more external command is at least one of a network set-up command, a console output command, an execution command of the external command, a kernel module initialization command, a secondary memory unit initialization command, a preread command, an environment variable set-up command, and a wait command.

5. The method of claim 1, wherein at least one command defined in the initial shell script is directly inserted into a sub-routine in the corresponding binary script.

6. The method of claim 1, wherein the binary script is stored in the secondary memory unit.

7. A method of operating a binary script during initializing a system while booting an operating system, comprising:

calling an execution table where the binary script is written, wherein the binary script is generated by binarizinq an initial shell script, and wherein the binarizinq does not comprise interpretation;

sequentially calling and reading the binary script from the called execution table, wherein the binary script is used instead of the initial shell script during initializing a system while booting the operating system;

classifying a command and a factor included in a sub-routine of the corresponding binary script by searching the sub-routine of the called binary script; and executing the classified command and factor, wherein after the command and factor included in the sub-routine of the called binary script are executed, a next binary script written in the execution table is called.

8. The method of claim 7, wherein the command included in the sub-routine of the binary script is at least one of a network set-up command, a console output command, an execution command of the external command, a kernel module initialization command, a secondary memory unit initialization command, a preread command, an environment variable set-up command, and a wait command.

9. The method of claim 7, wherein a next binary script is continuously called until all binary scripts written in the execution table are called.

10. The method of claim 7, further comprising: terminating system initialization and performing a next booting process when there remain no binary scripts to be read in the execution table.

* * * * *